US012008968B2

(12) United States Patent
Hong

(10) Patent No.: US 12,008,968 B2
(45) Date of Patent: Jun. 11, 2024

(54) DISPLAY DEVICE

(71) Applicant: LG Display Co., Ltd., Seoul (KR)

(72) Inventor: MooKyoung Hong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/974,414

(22) Filed: Oct. 26, 2022

(65) Prior Publication Data

US 2023/0215387 A1 Jul. 6, 2023

(30) Foreign Application Priority Data

Dec. 31, 2021 (KR) ........................ 10-2021-0194062

(51) Int. Cl.
*G09G 3/3291* (2016.01)
*G09G 3/3266* (2016.01)

(52) U.S. Cl.
CPC ......... *G09G 3/3291* (2013.01); *G09G 3/3266* (2013.01); *G09G 2310/0278* (2013.01); *G09G 2310/0294* (2013.01); *G09G 2310/08* (2013.01); *G09G 2320/0626* (2013.01)

(58) Field of Classification Search
CPC ............... G09G 3/3291; G09G 3/3266; G09G 2320/103; G09G 2320/062; G09G 2310/0294; G09G 2310/0278; G09G 2320/0626
See application file for complete search history.

(56) References Cited

U.S. PATENT DOCUMENTS

2005/0062691 A1* 3/2005 Tamura ................ G09G 3/2092 345/76
2007/0120807 A1* 5/2007 Bai ........................ G09G 3/342 345/102
2011/0292099 A1* 12/2011 Kim ..................... G09G 3/3614 345/99
2012/0287251 A1* 11/2012 Paczkowski ......... H04N 13/239 348/51
2015/0154913 A1* 6/2015 Kim ..................... G09G 3/3258 345/691
2016/0049113 A1* 2/2016 Park ..................... G09G 3/3208 345/212
2016/0163245 A1* 6/2016 Mu .......................... G09G 3/20 345/55
2018/0053462 A1* 2/2018 Bae ...................... G09G 3/2074
2019/0371250 A1* 12/2019 Baek .................... G09G 3/3291
2021/0118352 A1* 4/2021 Baek .................... G09G 3/2007
2023/0083289 A1* 3/2023 Lee ........................ G09G 5/393 345/204

FOREIGN PATENT DOCUMENTS

KR 10-2018-0039809 A 4/2018
KR 10-2021-0063733 A 6/2021

* cited by examiner

*Primary Examiner* — Dismery Mercedes
(74) *Attorney, Agent, or Firm* — Fenwick & West LLP

(57) ABSTRACT

A display device includes: a display panel on which a plurality of pixels are disposed; a timing controller configured to receive Nth frame data and (N+1)th frame data and output a luminance control signal; and a power supply configured to output a reference voltage from a plurality of reference voltages each having a different level in response to the luminance control signal, in which output luminance of the plurality of pixels is determined according to the level of the reference voltage thereby maximizing an HDR effect.

17 Claims, 5 Drawing Sheets

DISPLAY DEVICE

CROSS-REFERENCE TO RELATED APPLICATIONS

This application claims the priority of Republic of Korea Patent Application No. 10-2021-0194062 filed on Dec. 31, 2021, in the Korean Intellectual Property Office, the disclosure of which is hereby incorporated by reference in its entirety.

BACKGROUND

Field

The present disclosure relates to a display device, and more particularly, to a display device capable of implementing a high dynamic range (HDR) effect.

Description of the Related Art

As display devices used for a monitor of a computer, a television (TV) set, a mobile phone, and the like, there are an organic light-emitting display (OLED) configured to autonomously emit light, and a liquid crystal display (LCD) that requires a separate light source to emit light.

Among the various display devices, the organic light-emitting display device includes: a display panel including a plurality of subpixels and a drive unit configured to operate the display panel. The drive unit includes a gate drive part configured to supply a gate signal to the display panel and a data drive part configured to supply a data voltage. When signals such as the gate signal and the data voltage are supplied to the subpixels of the organic light-emitting display device, the selected subpixels may emit light, thereby displaying images.

Meanwhile, there is a need to implement a high dynamic range (HDR) effect in order to clearly express a difference in luminance between a plurality of frames in an image in which the luminance greatly varies between the plurality of frames like a shining star.

SUMMARY

An object to be achieved by the present disclosure is to provide a display device capable of maximizing a high dynamic range (HDR) effect.

Another object to be achieved by the present disclosure is to provide a display device capable of changing a drive current of a driving transistor by controlling a reference voltage.

Objects of the present disclosure are not limited to the above-mentioned objects, and other objects, which are not mentioned above, can be clearly understood by those skilled in the art from the following descriptions.

In one embodiment, a display device comprises: a display panel including a plurality of pixels; a timing controller configured to receive Nth frame data and (N+1)th frame data and output a luminance control signal based on the Nth frame data and the (N+1)th frame data; and a power supply configured to generate a plurality of reference voltages each having a different level and output a reference voltage from the plurality of reference voltages responsive to the luminance control signal, wherein output luminance of the plurality of pixels is determined according to a level of the outputted reference voltage, and wherein N is a natural number of one or more.

In one embodiment, a display device comprises: a display panel including a plurality of pixels configured to display an image; a data driver configured to generate a data voltage of the image; and a gate driver configured to generate a scan signal, wherein at least one of the plurality of pixel includes: a driving transistor including a first electrode of the driving transistor that is connected to a first node to which a power supply voltage is applied, a gate electrode of the driving element that is connected to a second node to which the data voltage is applied, and a second electrode of the driving element that is connected to a third node; a light emitting element including an anode electrode connected to the third node; a first switch element configured to supply the data voltage to the second node responsive to the scan signal being applied to the first switch element; and a second switch element connected to the second node, the second switch element configured to apply one of a plurality of reference voltages each having a different level to the second node, wherein an output luminance of the pixel is based on a level of the outputted reference voltage to the second node.

In one embodiment, a display device comprises: a display panel including a plurality of pixels; and a timing controller including a data comparator is that configured to simultaneously receive first frame data and second frame data, and output a luminance control signal based on a comparison of the first frame data and the second frame data that were simultaneously received, wherein an output luminance of the plurality of pixels is based on the luminance control signal.

Other matters of the exemplary embodiments are included in the detailed description and the drawings.

According to the present disclosure, the plurality of frame data is simultaneously applied, such that a data comparison processing speed may increase.

According to the present disclosure, the level of the reference voltage may be changed in accordance with the data comparison value, thereby maximizing the HDR effect.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
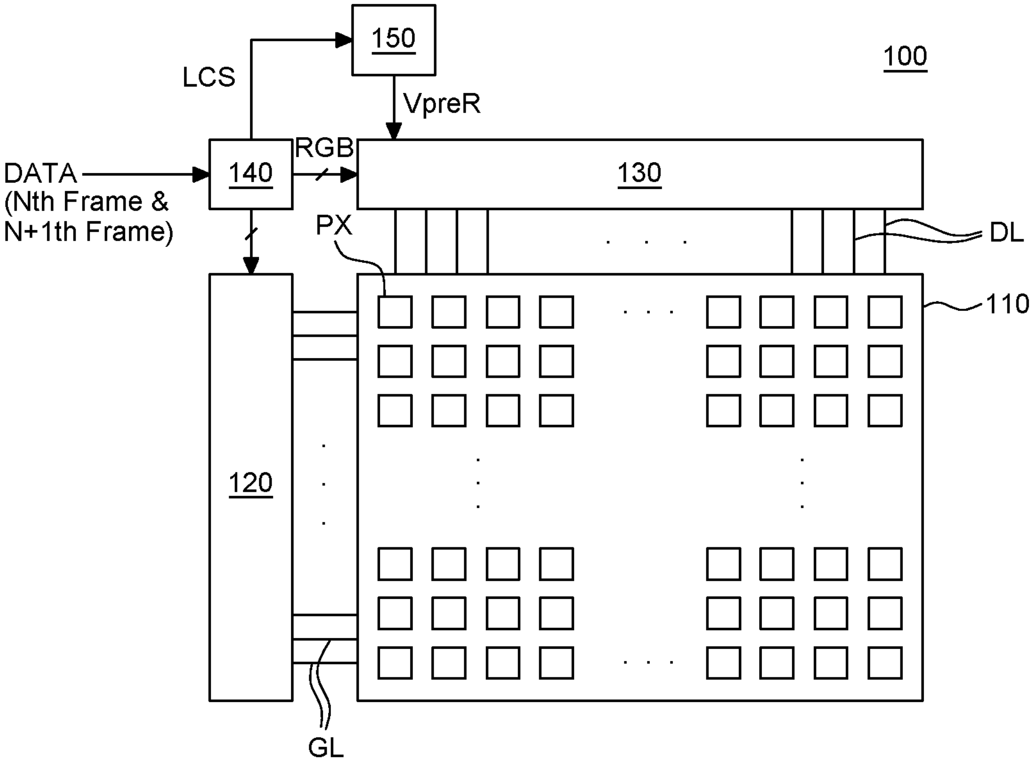
FIG. 1 is a schematic view of a display device according to an embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Transistors used for a display device according to the present disclosure may be implemented as one or more transistors among n-channel transistors (NMOS) and p-channel transistors (PMOS). The transistor may be implemented as an oxide semiconductor transistor having an active layer made of an oxide semiconductor or a low-temperature polysilicon (LTPS) transistor having an active layer made of low-temperature polysilicon (LTPS). The transistor may at least include a gate electrode, a source electrode, and a drain electrode. The transistor may be implemented as a thin-film transistor (TFT) on a display panel. In the transistor, carriers flow from the source electrode to the drain electrode. Because the carrier is the electron in the n-channel transistor (NMOS), a source voltage is less than a drain voltage so that the electrons flow from the source electrode to the drain electrode. In the n-channel transistor (NMOS), the current may flow from the drain electrode to the source electrode, and the source electrode may be an output terminal. Because the carrier is the positive hole in the p-channel transistor (PMOS), a source voltage is greater than a drain voltage so that the positive holes flow from the source electrode to the drain electrode. Because the positive holes flow from the source electrode to the drain electrode in the p-channel transistor (PMOS), the current may flow from the source to the drain, and the drain electrode may be an output terminal. Therefore, it should be noted that the source and the drain of the transistor are not fixed because the source and the drain may be changed in accordance with an applied voltage. The present specification is described on the assumption that the transistor is the n-channel transistor (NMOS). However, the present disclosure is not limited thereto. The p-channel transistor may be used as the transistor. Therefore, the circuit configuration may be changed.

A gate signal of the transistor using switch elements swings between a turn-on voltage and a turn-off voltage. The turn-on voltage is set to a voltage greater than a threshold voltage Vth of the transistor. The turn-off voltage is set to a voltage less than the threshold voltage Vth of the transistor. The transistor is turned on in response to the turn-on voltage. In contrast, the transistor is turned off in response to the turn-off voltage. In the case of the NMOS, the turn-on voltage may be a high voltage, and the turn-off voltage may be a low voltage. In the case of the PMOS, the turn-on voltage may be a low voltage, and the turn-off voltage may be a high voltage.

Hereinafter, various embodiments of the present disclosure will be described in detail with reference to the accompanying drawings.

FIG. 1 is a schematic view of a display device according to an embodiment of the present disclosure.

Referring to FIG. 1, the display device 100 includes a display panel 110, a gate drive part 120, a data drive part 130, a timing controller 140, and a power supply 150.

The display panel 110 is a panel configured to display images. The display panel 110 may include various circuits, lines, and light-emitting elements disposed on a substrate. The display panel 110 may include a plurality of pixels PX defined by a plurality of data lines DL and a plurality of gate lines GL that intersect one another. The plurality of pixels PX is connected to the plurality of data lines DL and the plurality of gate lines GL. The display panel 110 may include a display area defined by the plurality of pixels PX, and a non-display area in which various types of signal lines or various pads are formed. The display panel 110 may be implemented as the display panel 110 used for various display devices such as a liquid crystal display device, an organic light-emitting display device, and an electrophoretic display device. Hereinafter, the configuration will be described in which the display panel 110 is a panel used for an organic light-emitting display device. However, the present disclosure is not limited thereto.

The timing controller 140 receives timing signals such as a vertical synchronizing signal, a horizontal synchronizing signal, a data enable signal, and a dot clock signal through a receiving circuit such as an LVDS or TMDS interface connected to a host system. Based on the inputted timing signal, the timing controller 140 generates data control signals for controlling the data drive part 130 and gate control signals for controlling the gate drive part 120.

Further, the timing controller 140 processes frame data (DATA((Nth Frame & (N+1)th Frame)) inputted, for each frame, from the outside so that the frame data are suitable for the size and resolution of the display panel 110. The timing controller 140 converts the frame data into image data RGB and supplies the image data RGB to the data drive part 130.

Further, the timing controller 140 senses characteristic values (mobility, threshold voltage) of the driving transistor disposed on each of the plurality of pixels PX and generates compensation data for the characteristic values (mobility, threshold voltage) of the driving transistor. Further, the timing controller 140 may compensate for the image data RGB by using compensation data.

The data drive part 130 supplies data voltages Vdata to the plurality of subpixels. The data drive part 130 may include a source printed circuit board and a plurality of source drive integrated circuits. The plurality of source drive integrated circuits may each receive the image data RGB and the data control signal from the timing controller 140 through the source printed circuit board.

The data drive part 130 may generate the data voltage by converting the image data RGB into a gamma voltage in response to the data control signal. The data drive part 130 may supply the data voltage through the data line DL of the display panel 110.

Further, the data drive part 130 may receive a sensing voltage from the plurality of pixels PX and convert the sensing voltage into sensing data in respect to the characteristic values (mobility, threshold voltage) of the driving transistor. Further, the data drive part 130 may output the sensing data to the timing controller 140.

The plurality of source drive integrated circuits may be provided in the form of a chip-on-film (COF) and connected to the data line DL of the display panel 110. More specifically, the plurality of source drive integrated circuits may each be provided in the form of a chip disposed on a connection film. A line connected to the source drive integrated circuit in the form of a chip may be formed on the connection film. However, the arrangement shape of the plurality of source drive integrated circuits is not limited thereto. The plurality of source drive integrated circuits may be connected to the data line DL of the display panel 110 in a chip-on-glass (COG) or tape automated bonding (TAB) process.

The gate drive part 120 supplies gate signals to the plurality of subpixels. The gate drive part 120 may include a level shifter and a shift register. The level shifter may shift a level of a clock signal inputted at a transistor-transistor-logic (TTL) level from the timing controller 140 and supply the clock signal to the shift register. The shift register may be formed by a gate-in-panel (GIP) method in the non-display area of the display panel 110. However, the present disclosure is not limited thereto. The shift register may include a plurality of stages configured to shift the gate signal to correspond to the clock signal and the driving signal and output the gate signal. The plurality of stages included in the shift register may sequentially output the gate signal through a plurality of output ports.

The display panel 110 may include the plurality of subpixels. The plurality of subpixels may be subpixels that emit light beams with different colors. For example, the plurality of subpixels may include a red subpixel, a green subpixel, a blue subpixel, and a white subpixel. However, the present disclosure is not limited thereto. The plurality of subpixels may constitute the pixel PX. That is, the red subpixel, the green subpixel, the blue subpixel, and the white subpixel may constitute a single pixel PX. The display panel 110 may include the plurality of pixels PX.

Hereinafter, the drive circuit for operating one pixel will be described in more detail with reference to FIG. 2.

Figure 2:
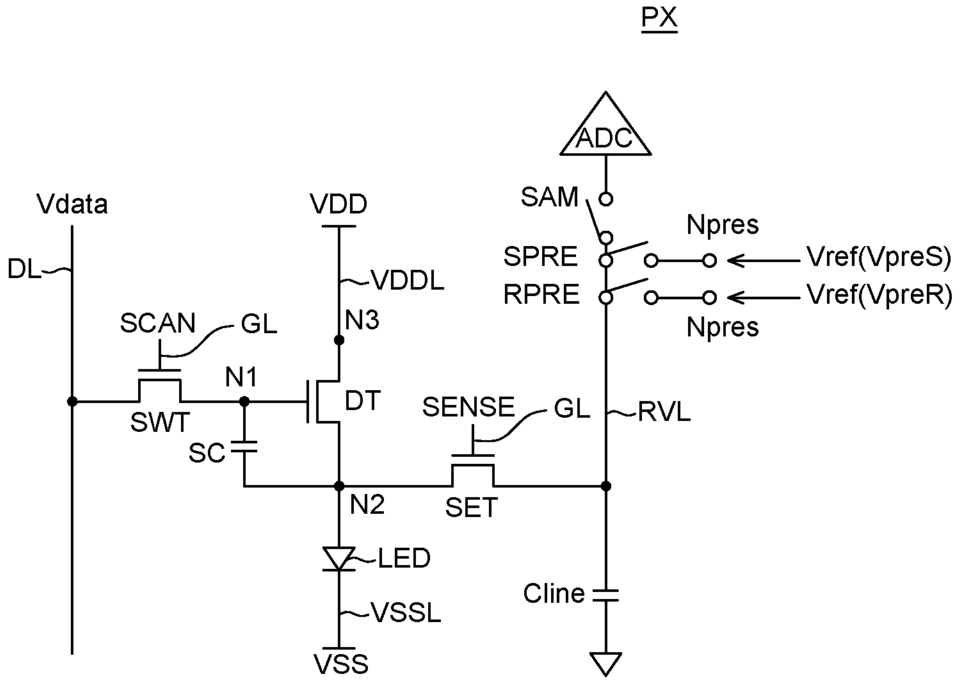
FIG. 2 is a circuit diagram illustrating a pixel of the display device according to the embodiment of the present disclosure.

FIG. 2 is a circuit diagram illustrating the pixel of the display device according to the embodiment of the present disclosure.

FIG. 2 is a circuit diagram illustrating one pixel among the plurality of pixels of the display device 100.

Referring to FIG. 2, the pixel may include a switching transistor SWT, a sensing transistor SET, a driving transistor DT, a storage capacitor SC, and a light-emitting element LED in one embodiment.

The light-emitting element LED may include an anode, an organic layer, and a cathode. The organic layer may include various organic layers such as a hole injection layer, a hole transport layer, an organic light-emitting layer, an electron transport layer, and an electron injection layer. The anode of the light-emitting element LED may be connected to an output terminal of the driving transistor DT. A low-potential voltage VSS may be applied to the cathode through a low-potential voltage line VSSL. FIG. 2 illustrates that the light-emitting element LED is an organic light-emitting element. However, the present disclosure is not limited thereto.

The low-potential voltage line VSSL is a constant power line for applying a low-potential voltage that is constant power. The low-potential voltage line VSSL may be called a grounding terminal.

Referring to FIG. 2, the switching transistor SWT is a transistor for transmitting the data voltage Vdata to a first node N1 corresponding to the gate electrode of the driving transistor DT. The switching transistor SWT may include a drain electrode connected to the data line DL, a gate electrode connected to the gate line GL, and a source electrode connected to the gate electrode of the driving transistor DT. The switching transistor SWT may be turned on in response to a scan signal SCAN applied from the gate line GL and transmit the data voltage Vdata, which is supplied from the data line DL, to the first node N1 corresponding to the gate electrode of the driving transistor DT.

Referring to FIG. 2, the driving transistor DT is a transistor for operating the light-emitting element LED by supplying a drive current to the light-emitting element LED. The driving transistor DT may include a gate electrode corresponding to the first node N1, a source electrode corresponding to a second node N2 and an output terminal, and a drain electrode corresponding to a third node N3 and an input terminal. The gate electrode of the driving transistor DT may be connected to the switching transistor SWT. The drain electrode may receive a high-potential voltage VDD (e.g., a power supply voltage) through a high-potential voltage line VDDL. The source electrode may be connected to the anode of the light-emitting element LED.

Referring to FIG. 2, the storage capacitor SC is a capacitor for maintaining, for one frame, a voltage corresponding to the data voltage Vdata. A first electrode of the storage capacitor SC may be connected to the first node N1. A second electrode of the storage capacitor SC may be connected to the second node N2.

Meanwhile, in the case of the display device 100, the circuit element such as the driving transistor DT may be degraded as the operating time of each of the pixels increases. Therefore, an inherent characteristic value of the circuit element such as the driving transistor DT may change. In this case, the inherent characteristic values of the circuit element may include the threshold voltage Vth of the driving transistor DT, mobility a of the driving transistor DT, and the like. A change in characteristic value of the circuit element may cause a change in luminance of the corresponding pixel. Therefore, the change in characteristic value of the circuit element may be used as the same concept as the change in luminance of the pixel.

In addition, a degree of the change in characteristic values between the circuit elements of each of the pixels may vary according to a difference in degree of degradation between the circuit elements. A difference in degree of change in characteristic values between the circuit elements may cause a luminance deviation between the pixels. Therefore, the deviation of characteristic values between the circuit element may be used as the same concept as the luminance deviation between the pixels. The change in characteristic value of the circuit element, such as the change in luminance of the pixel and/or the deviation between the characteristic values of the circuit elements such as the luminance deviation between the pixels may cause problems such as deterioration accuracy of luminance expression of the pixel or screen abnormality.

Therefore, a sensing function of sensing the characteristic values of the pixels and a compensation function of compensating for the characteristic value of the pixel by using the sensing result may be provided to the pixels of the display device 100 according to the embodiment of the present disclosure.

Therefore, as illustrated in FIG. 2, in addition to the switching transistor SWT, the driving transistor DT, the storage capacitor SC, and the light-emitting element LED, the pixel PX may further include a sensing transistor SET for effectively controlling a voltage state of the source electrode of the driving transistor DT.

Referring to FIG. 2, the sensing transistor SET is connected to a reference voltage line RVL for supplying a reference voltage Vref to the source electrode of the driving transistor DT at second node N2. The gate electrode of the sensing transistor SET is connected to the gate line GL. Therefore, the sensing transistor SET may be turned on in response to a sensing signal SENSE applied through the gate line GL and apply the reference voltage Vref, which is supplied through the reference voltage line RVL, to the source electrode of the driving transistor DT. In addition, the sensing transistor SET may be used as one of the voltage sensing paths for sensing the source electrode of the driving transistor DT.

Referring to FIG. 2, the switching transistor SWT and the sensing transistor SET of the pixel may share the single gate line GL. That is, the switching transistor SWT and the sensing transistor SET may be connected to the same gate line GL and receive the same gate signal. However, for the convenience of description, the voltage applied to the gate electrode of the switching transistor SWT is referred to as the scan signal SCAN, the voltage applied to the gate electrode of the sensing transistor SET is referred to as the sensing signal SENSE. However, the scan signal SCAN and the sensing signal SENSE, which are applied to the single pixel, are identical signals transmitted from the same gate line GL.

However, the present disclosure is not limited thereto. In one embodiment, the switching transistor SWT may be connected to the gate line GL, and the sensing transistor SET may be connected to a separate sensing line. Therefore, the scan signal SCAN may be applied to the switching transistor SWT through the gate line GL. The sensing signal SENSE may be applied to the sensing transistor SET through the sensing line.

Therefore, the reference voltage Vref is applied to the source electrode of the driving transistor DT through the sensing transistor SET. Further, the sensing voltage for sensing the threshold voltage Vth of the driving transistor DT or the mobility a of the driving transistor DT is detected through the reference voltage line RVL. Further, the data drive part 130 may compensate for the data voltage Vdata according to the amount of detected change in threshold voltage Vth of the driving transistor DT or the amount of detected change in mobility a of the driving transistor DT.

As described above, the display device 100 according to the embodiment of the present disclosure may detect the characteristic value of the driving transistor DT in the pixel PX or the change in characteristic value from the sensing voltage of the reference voltage line RVL for a sensing period. Therefore, the reference voltage line RVL may not only serve to transmit the reference voltage Vref, but also serve as a sensing line for sensing the characteristic value of the driving transistor DT in the pixel PX. Therefore, the reference voltage line RVL may be called the sensing line.

Figure 3:
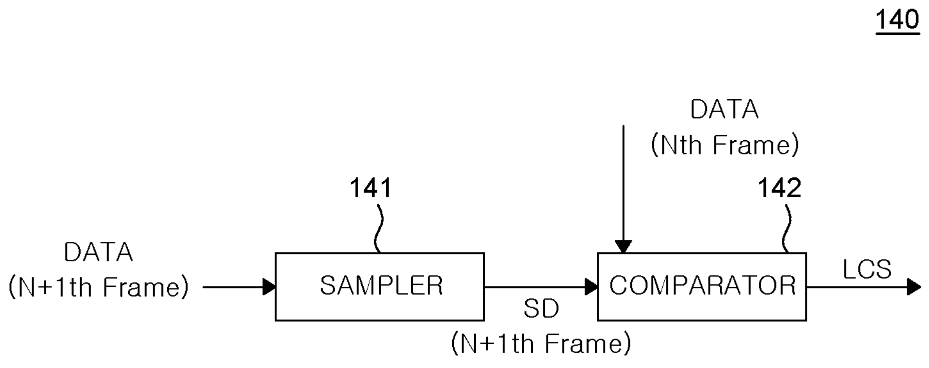
FIG. 3 is a block diagram of a timing controller of the display device according to the embodiment of the present disclosure.

Specifically, referring to FIGS. 2 and 3, in the sensing period of the display device 100 according to the embodiment of the present disclosure, the characteristic value of the driving transistor DT or the change in characteristic value may be adopted as a voltage (e.g., Vdata−Vth) of the second node N2 of the driving transistor DT.

The voltage of the second node N2 of the driving transistor DT may correspond to the sensing voltage of the reference voltage line RVL when the sensing transistor SET is in the turn-on state. In addition, a line capacitor Cline on the reference voltage line RVL may be charged by the voltage of the second node N2 of the driving transistor DT. With the charged line capacitor Cline, the reference voltage line RVL may have a sensing voltage corresponding to the voltage of the second node N2 of the driving transistor DT.

The display device 100 according to the embodiment of the present disclosure performs ON-OFF control on the switching transistor SWT and the sensing transistor SET in the pixel PX to be sensed and controls the supply of the data voltage Vdata and the reference voltage Vref. Therefore, the display device 100 may operate to implement a voltage state in which the second node N2 of the driving transistor DT reflects the characteristic value (threshold voltage, mobility) of the driving transistor DT or the change in characteristic value.

In the plurality of pixels PX of the display device 100 according to the embodiment of the present disclosure, may also include an analog-digital converter (ADC) configured to measure the sensing voltage of the reference voltage line RVL corresponding to the voltage of the second node N2 of the driving transistor DT and convert the sensing voltage into a digital value, switch circuits SAM and SPRE for sensing the characteristic value, and a switch RPRE for an image operation.

The switch circuits SAM and SPRE for controlling the sensing operation may include the sensing reference switch SPRE configured to control connection between the reference voltage line RVL and a sensing reference voltage supply node Npres for supplying the reference voltage Vref, and a sampling switch SAM configured to control connection between the reference voltage line RVL and the ADC.

In this case, the sensing reference switch SPRE is a switch for controlling the sensing operation. The reference voltage Vref supplied to the reference voltage line RVL by the sensing reference switch SPRE is a sensing reference voltage VpreS.

The image driving reference switch RPRE may control connection between the reference voltage line RVL and an image driving reference voltage supply node Nprer for supplying the reference voltage Vref. The image driving reference switch RPRE is a switch used for the image operation. The reference voltage Vref supplied to the reference voltage line RVL by the image driving reference switch RPRE corresponds to an image driving reference voltage VpreR.

That is, the sensing reference switch SPRE, which is a first voltage switch, may apply the sensing reference voltage VpreS to the reference voltage line RVL. Further, the image driving reference switch RPRE, which is a second voltage switch, may apply the image driving reference voltage VpreR to the reference voltage line RVL.

In this case, the display device 100 according to the embodiment of the present disclosure may change the image driving reference voltage VpreR to various levels in response to a luminance control signal. Hereinafter, for the convenience of description, the image driving reference voltage VpreR is referred to as a reference voltage.

FIG. 3 is a block diagram of the timing controller of the display device according to the embodiment of the present disclosure.

Figure 4:
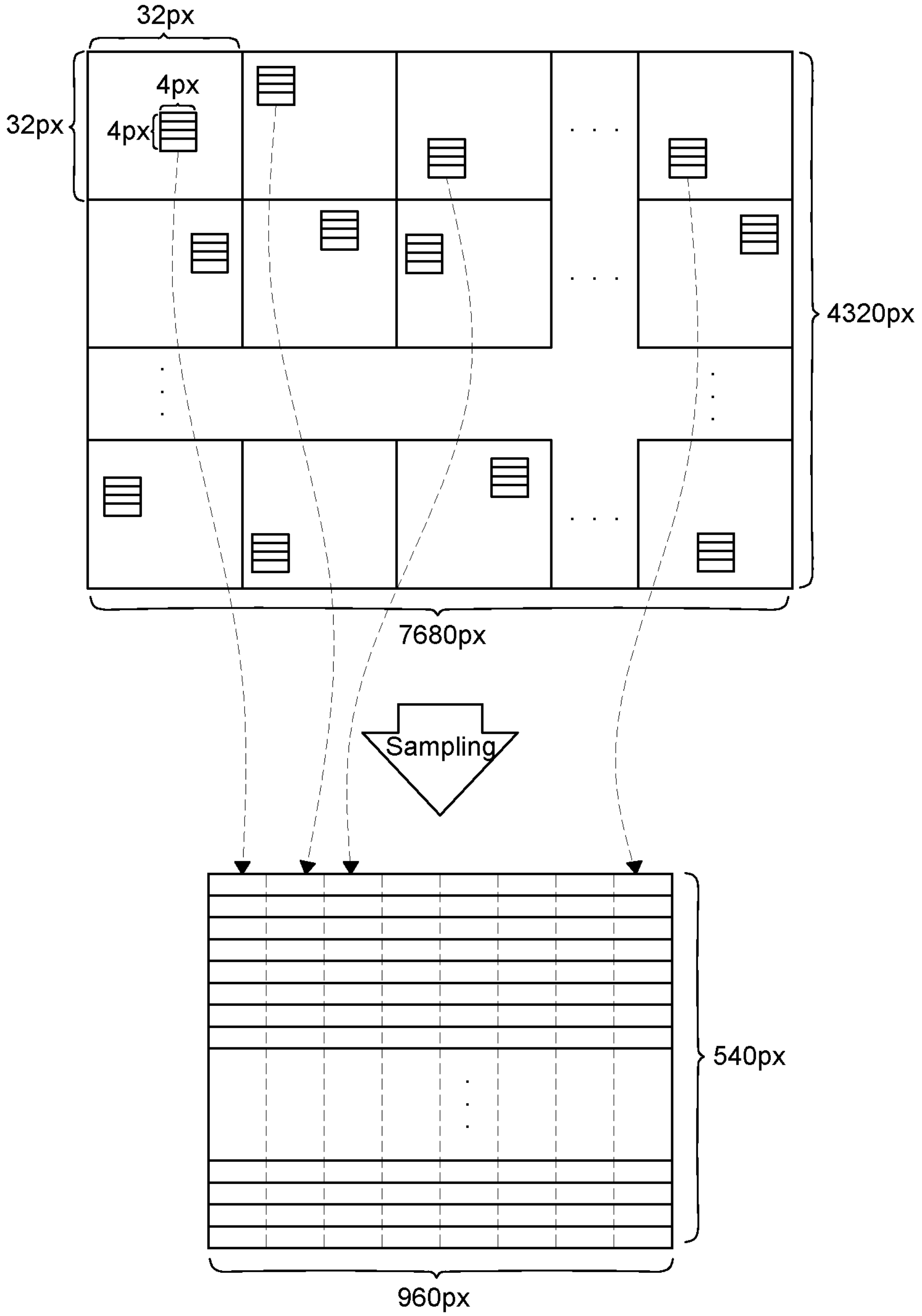
FIG. 4 is a view for explaining an operation of a data sampler of the display device according to the embodiment of the present disclosure.

FIG. 4 is a view for explaining an operation of a data sampler of the display device according to the embodiment of the present disclosure.

The timing controller 140 includes a data sampler 141 (e.g., a circuit) configured to sample frame data, and a data comparator 142 (e.g., a circuit) configured to compare the data and output the luminance control signal.

Further, the data sampler 141 samples a part of (N+1)th frame data (DATA(N+1th Frame)). Specifically, as illustrated in FIG. 4, the (N+1)th frame data (DATA(N+1th Frame)) in respect to 7580×4320 pixels are transmitted to the data sampler 141. Further, the data sampler 141 samples data in respect to 4×4 pixels randomly among 32×32 pixels in the (N+1)th frame data (DATA(N+1th Frame)). Therefore, the data sampler 141 may extract (N+1)th sampling data (SD(N+1th Frame)) in respect to 960×540 pixels by sampling the (N+1)th frame data (DATA(N+1th Frame)) by using the above-mentioned mechanism.

However, the data sampler 141 has been described as being included in the timing controller 140. However, the present disclosure is not limited thereto. The data sampler 141 may be disposed in a separate set circuit connected to an input port of the timing controller 140.

Further, the data comparator 142 compares the (N+1)th sampling data (SD(N+1th Frame)) and the Nth frame data (DATA(Nth Frame)) and outputs a luminance control signal LCS.

Specifically, the data comparator 142 calculates a first average image level (e.g., an average brightness level) from the (N+1)th sampling data (SD(N+1th Frame)) and calculates a second average image level (e.g., an average brightness level) from the Nth frame data (DATA(Nth Frame)). Further, the data comparator 142 outputs a difference between the first average image level and the second average image level as the luminance control signal LCS.

That is, the data comparator 142 may calculate complexity of the frame on the basis of an average image level (APL) of the respective frames and thus generate the luminance control signal LCS for controlling luminance. Further, the data comparator 142 may calculate the average image level on the basis of a motion (Moving AVG) of the image or calculate the average image level on the basis of scene change detection. However, the present disclosure is not limited thereto.

Alternatively, the data comparator 142 calculates first average current luminance from the (N+1)th sampling data (SD(N+1th Frame)) and calculates second average current luminance from the Nth frame data (DATA(Nth Frame)). Further, the data comparator 142 may output a difference between the first average current luminance and the second average current luminance as the luminance control signal LCS.

That is, the data comparator 142 may calculate complexity of the frame on the basis of average current luminance (ACL) of the respective frames and thus generate the luminance control signal LCS for controlling luminance. Further, the data comparator 142 may count frequencies of representative luminance values by analyzing the histogram of the frame data, calculate a representative current for each of the representative luminance values to which peak luminance is applied. Then, the data comparator 142 may sum up values made by multiplying the representative current by the number of counts of the representative luminance values and calculates a total current for the respective frames, thereby a total estimated current for the respective frames can be obtained. However, the present disclosure is not limited thereto.

That is, when the difference between the (N+1)th sampling data (SD(N+1th Frame)) and the Nth frame data (DATA(Nth Frame)) is relatively large, a level of the luminance control signal LCS is a high level. In this case, because there is a large data difference between the current frame and the next frame, it is necessary to increase a high dynamic range (HDR) effect.

On the contrary, when the difference between the (N+1)th sampling data (SD(N+1th Frame)) and the Nth frame data (DATA(Nth Frame)) is a relatively small, the level of the luminance control signal LCS may be a low level. In this case, because there is a small data difference between the current frame and the next frame, it is not necessary to increase a high dynamic range (HDR) effect.

As a result, the level of the luminance control signal LCS may be determined according to the difference between the (N+1)th sampling data (SD(N+1th Frame)) and the Nth frame data (DATA(Nth Frame)).

Meanwhile, the (N+1)th sampling data (SD(N+1th Frame)) and the Nth frame data (DATA(Nth Frame)) may be simultaneously inputted to the data comparator 142.

If the (N+1)th sampling data (SD(N+1th Frame)) are applied after the Nth frame data (DATA(Nth Frame)) are applied, like the display device in the related art, the data comparator 142 needs to be in standby for one frame in order to perform the operation. Further, it may be necessary to provide a separate memory for storing the Nth frame data (DATA(Nth Frame)) while the data comparator is in standby.

However, in the display device according to the embodiment of the present disclosure, the (N+1)th sampling data (SD(N+1th Frame)) and the Nth frame data (DATA(Nth Frame)) are simultaneously inputted to the data comparator 142, such that the data comparator 142 may perform the comparison without an additional delay time. Therefore, a data processing speed may increase. In addition, because a separate memory is not required to operate the data comparator 142, the circuit constituting the data comparator may also be simplified.

Figure 5:
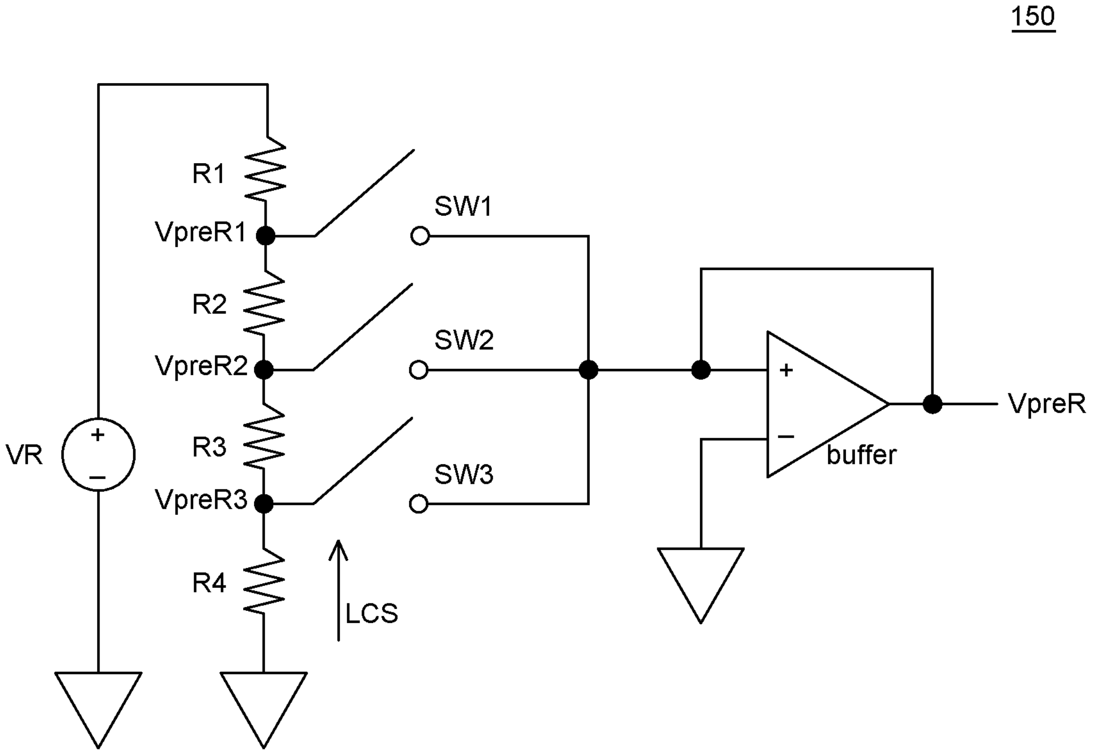
FIG. 5 is a circuit diagram illustrating a power supply of the display device according to the embodiment of the present disclosure.

FIG. 5 is a circuit diagram illustrating the power supply of the display device according to the embodiment of the present disclosure.

As illustrated in FIG. 5, the power supply 150 may include a multiplexer that selects any one of plurality of reference voltages VpreR1, VpreR2, and VpreR3 each having a different voltage level in response to the luminance control signal LCS. Specifically, the power supply 150 may include: resistor strings R1 to R4 including a plurality of resistors; a constant power source configured to provide a fixed voltage VR; a plurality of switches SW1, SW2, and SW3 configured to be controlled in response to the luminance control signal LCS; and a buffer configured to output the selected reference voltage VpreR.

The plurality of resistor strings R1 to R4 may include first to fourth resistors R1, R2, R3, and R4 connected in series. Further, the plurality of resistor strings R1 to R4 divides the fixed voltage VR into a first reference voltage VpreR1 due to a voltage drop across resistor R1, a second reference voltage VpreR2 due to a voltage drop across resistors R1 and R2, and a third reference voltage VpreR3 due to a voltage drop across resistors R1, R2, and R3 such that each reference voltage has a different voltage level. For example, the first reference voltage VpreR1 may be set to VR*(R2+R3+R4)/(R1+R2+R3+R4). The second reference voltage VpreR2 may be set to VR*(R3+R4)/(R1+R2+R3+R4). The third reference voltage VpreR3 may be set to VR*(R4)/(R1+R2+R3+R4).

That is, a level of the second reference voltage VpreR2 may be lower than a level of the first reference voltage VpreR1. A level of the third reference voltage VpreR3 may be lower than the level of the second reference voltage VpreR2 and the first reference voltage VpreR1.

Further, the plurality of switches outputs, to the buffer, one of the first reference voltage VpreR1, the second reference voltage VpreR2, and the third reference voltage VpreR3 in response to the luminance control signal LCS.

Further, the plurality of switches SW1, SW2, and SW3 may include a first switch SW1 configured to select a first reference voltage VpreR1, a second switch SW2 configured to select a second reference voltage VpreR2, and a third switch SW3 configured to select a third reference voltage VpreR3, in response to the luminance control signal LCS.

Therefore, when the luminance control signal LCS is at a high level (e.g., a third level), the third switch SW3 is turned on, and the first switch SW1 and the second switch SW2 are turned off, such that the buffer may output the first reference voltage VpreR1. Further, when the luminance control signal LCS is at a middle level that is less than the high level (e.g., an intermediate level or second level), the second switch SW2 is turned on, and the first switch SW1 and the third switch SW3 are turned off, such that the buffer may output the second reference voltage VpreR2. Further, when the luminance control signal LCS is at a low level that is less than the high level and the level (e.g., a first level), the first switch SW1 is turned on, and the first switch SW1 and the second switch SW2 are turned off, such that the buffer may output the third reference voltage VpreR3.

Therefore, as the level of the luminance control signal LCS increases, the power supply 150 may output the reference voltage VpreR at a lower level amongst the plurality of reference voltages VpreR. Thus, the luminance control signal LCS and the reference voltage VpreR are inversely proportional to each other.

Hereinafter, an operation of the display device according to the embodiment of the present disclosure will be described with reference to FIG. 6.

Figure 6:
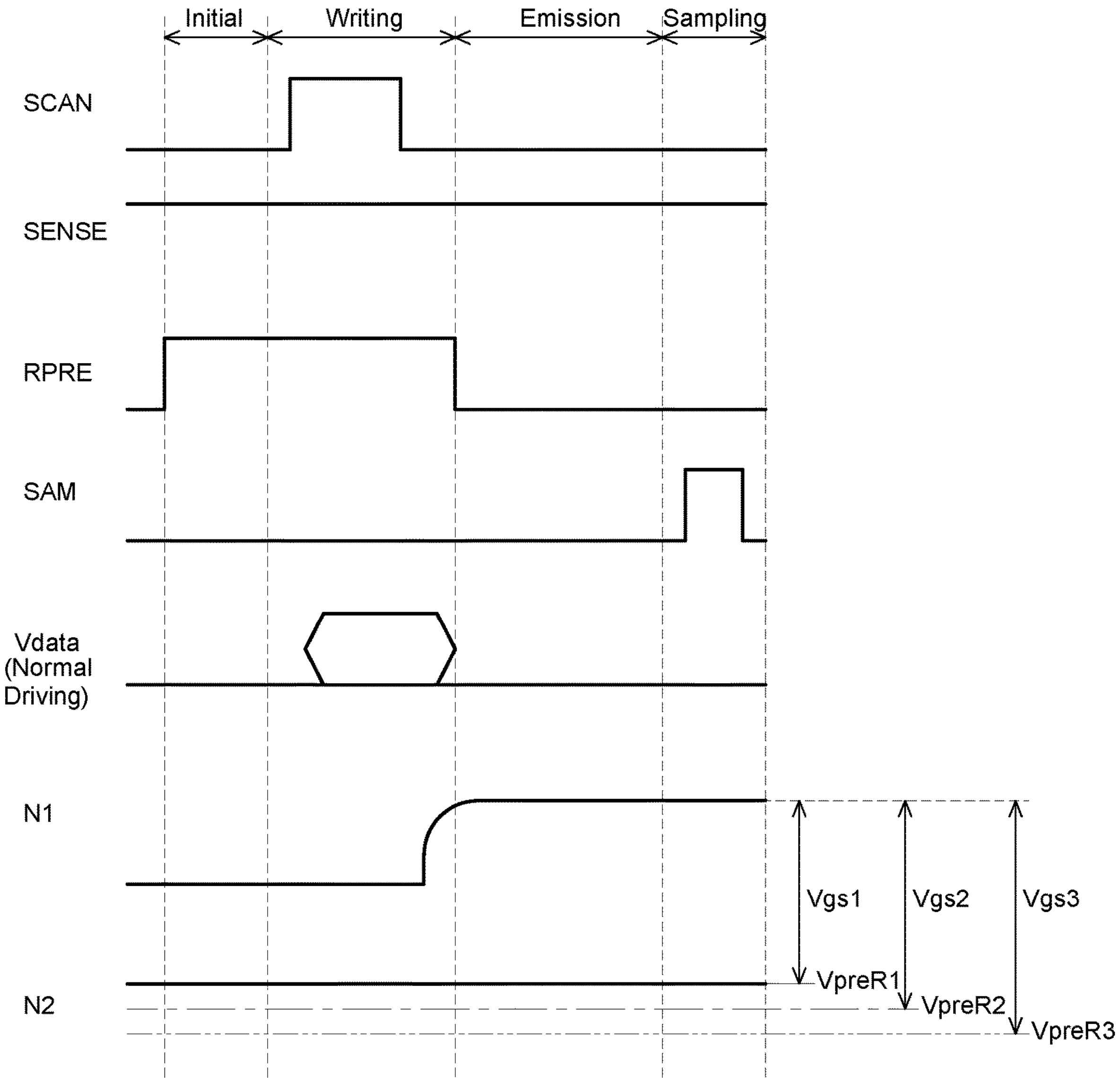
FIG. 6 is a signal timing diagram for an operation of the display device according to the embodiment of the present disclosure.

FIG. 6 is a signal timing diagram for an operation of the display device according to the embodiment of the present disclosure.

Referring to FIGS. 2 and 6, steps of operating the display device according to the embodiment of the present disclosure may include an initialization step (Initial), a writing step (Writing), and a light-emitting step (Emission). In general, the second node N2, which is the source electrode of the driving transistor DT, performs the sensing by independently turning on or off the switching transistor SWT and the sensing transistor SET. Therefore, unlike the configuration illustrated in FIG. 2, the sensing operation may be performed by the structure in which the scan signal SCAN and the sensing signal SENSE are respectively applied to the switching transistor SWT and the sensing transistor SET through the separate two gate lines GL.

In the initialization step (Initial), the sensing transistor SET is turned on by the sensing signal SENSE at the turn-on level, and the driving reference switch RPRE is turned on. In this state, the second node N2 of the driving transistor DT is initialized to the driving reference voltage VpreR. That is, according to the level of the luminance control signal LCS, the second node N2 of the driving transistor DT is initialized to one of the first reference voltage VpreR1, the second reference voltage VpreR2, and the third reference voltage VpreR3.

In the writing step (Writing), the switching transistor SWT is turned on by the scan signal SCAN at the turn-on level, and the data voltage Vdata for the normal operation is written to the first node N1 of the driving transistor DT.

Further, in the writing step (Writing), the sensing transistor SET is turned on by the sensing signal SENSE at the turn-on level, and the driving reference switch RPRE is turned on. Therefore, according to the level of the luminance control signal LCS, the second node N2 of the driving transistor DT is maintained as any one of the first reference voltage VpreR1, the second reference voltage VpreR2, and the third reference voltage VpreR3.

In the light-emitting step (Emission), the drive current flowing through the light-emitting element LED is determined according to the gate source voltage of the driving transistor, such that the light-emitting element LED emits light. That is, the luminance outputted by the light-emitting element LED is determined according to a voltage corresponding to a difference between the data voltage Vdata written to the first node N1 and any one of the first reference voltage VpreR1, the second reference voltage VpreR2, and the third reference voltage VpreR3 written to the second node N2.

That is, as indicated by the solid line, when the first reference voltage VpreR1 is written to the second node N2, a gate source voltage Vgs1 at a first level is determined, such that a drive current corresponding to the gate source voltage Vgs1 at the first level is generated.

Further, as indicated by the one-dot chain line, when the second reference voltage VpreR2 is written to the second node N2, a gate source voltage Vgs2 at a second level is determined, such that a drive current corresponding to the gate source voltage Vgs2 at the second level is generated.

Further, as indicated by the two-dot chain line, when the third reference voltage VpreR3 is written to the second node N2, a gate source voltage Vgs3 at a third level is determined, such that a drive current corresponding to the gate source voltage Vgs3 at the third level is generated.

Meanwhile, the level of the data voltage Vdata is predetermined. In contrast, the level of the second reference voltage VpreR2 may be less than the level of the first reference voltage VpreR1, and the level of the third reference voltage VpreR3 may be less than the level of the second reference voltage VpreR2.

Therefore, the gate source voltage Vgs1 at the first level is less than the gate source voltage Vgs2 of the second level, and the gate source voltage Vgs2 at the second level is less than the gate source voltage Vgs3 at the third level.

Therefore, low luminance may be outputted when the first reference voltage VpreR1 is written to the second node N2. Further, middle luminance may be outputted when the second reference voltage VpreR2 is written to the second node N2. Further, high luminance may be outputted when the third reference voltage VpreR3 is written to the second node N2.

That is, the display device according to the embodiment of the present disclosure may output the reference voltages Vpre at different levels in response to the luminance control signal LCS, thereby controlling the output luminance to maximize the HDR effect. Thus, the output luminance of the display device is based on the luminance control signal LCS and the reference voltages.

Specifically, as the level of the luminance control signal LCS corresponding to the difference between the (N+1)th sampling data (SD(N+1th Frame)) and the Nth frame data (DATA(Nth Frame)) increases, the reference voltage at the lower level may be outputted, thereby increasing the output luminance of the light-emitting element. The above-mentioned mechanism may maximize the HDR effect as the data voltage for each of the frames greatly varies.

The exemplary embodiments of the present disclosure can also be described as follows:

the timing controller may comprise a data sampler configured to extract (N+1)th sampling data by sampling the (N+1)th frame data; and a data comparator configured to compare the (N+1)th sampling data and the Nth frame data and output the luminance control signal.

The data comparator may calculate a first average image level from the Nth frame data, calculate a second average image level from the (N+1)th sampling data, and output a difference between the first average image level and the second average image level as the luminance control signal.

The data comparator may calculate first average current luminance from the Nth frame data, calculate second average current luminance from the (N+1)th sampling data, and output a difference between the first average current luminance and the first average current luminance as the luminance control signal.

The Nth frame data and the (N+1)th sampling data may be simultaneously inputted to the data comparator.

The power supply may include a multiplexer configured to select any one of the plurality of reference voltages at different levels in response to the luminance control signal.

The power supply may output the reference voltage at a low level as a level of the luminance control signal increases.

The power supply may comprise a first switch configured to select a first reference voltage in response to the luminance control signal; a second switch configured to select a second reference voltage; and a third switch configured to select a third reference voltage.

And a level of the second reference voltage may be lower than a level of the first reference voltage, and a level of the third reference voltage may be lower than a level of the second reference voltage.

Only the third switch of the power supply may be turned on when the luminance control signal is at a high level, only the second switch of the power supply may be turned on when the luminance control signal is at a middle level, and only the first switch of the power supply may be turned on when the luminance control signal is at a low level.

Each of the plurality of pixels comprises a driving transistor configured to apply a drive current to a light-emitting element, and a data voltage may be applied to a gate electrode of the driving transistor, and the reference voltage is applied to a source electrode of the driving transistor.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising:
- a display panel including a plurality of pixels;
- a timing controller configured to receive Nth frame data and (N+1)th frame data and output a luminance control signal based on the Nth frame data and the (N+1)th frame data; and
- a power supply configured to generate a plurality of reference voltages each having a different level and output a reference voltage from the plurality of reference voltages responsive to the luminance control signal,
- wherein output luminance of the plurality of pixels is determined according to a level of the outputted reference voltage,
- wherein N is a natural number of one or more, and
- wherein the timing controller comprises:
  - a data sampler configured to extract (N+1)th sampling data by sampling the (N+1)th frame data; and
  - a data comparator configured to compare the (N+1)th sampling data and the Nth frame data and output the luminance control signal based on a result of comparison.

2. The display device of claim 1, wherein the data comparator is configured to calculate a first average image level from the Nth frame data, calculate a second average image level from the (N+1)th sampling data, and output a difference between the first average image level and the second average image level as the luminance control signal.

3. The display device of claim 1, wherein the data comparator is configured to calculate a first average current luminance from the Nth frame data, calculate a second average current luminance from the (N+1)th sampling data, and output a difference between the first average current luminance and the second average current luminance as the luminance control signal.

4. The display device of claim 1, wherein the Nth frame data and the (N+1)th sampling data are simultaneously input to the data comparator.

5. The display device of claim 1, wherein the power supply includes a multiplexer configured to select one of the plurality of reference voltages responsive to the luminance control signal.

6. The display device of claim 5, wherein the power supply outputs the reference voltage having a lower level amongst the plurality of reference voltages as a level of the luminance control signal increases.

7. The display device of claim 5, wherein the power supply comprises:

a first switch configured to select a first reference voltage from the plurality of reference voltages;

a second switch configured to select a second reference voltage from the plurality of reference voltages; and a third switch configured to select a third reference voltage from the plurality of reference voltages, and wherein a level of the second reference voltage is less than a level of the first reference voltage, and a level of the third reference voltage is less than a level of the second reference voltage.

8. The display device of claim 7, wherein the third switch of the power supply is turned on and the first switch and the second switch are turned off responsive to the luminance control signal being at a third level, the second switch of the power supply is turned on and the first switch and the third switch are turned off responsive to the luminance control signal is at a second level that is less than the third level, and the first switch of the power supply is turned on and the second switch and the third switch are turned off responsive the luminance control signal is at a first level that is less than the third level and the second level.

9. The display device of claim 1, wherein each of the plurality of pixels comprises a driving transistor configured to apply a drive current to a light-emitting element, and wherein a data voltage is applied to a gate electrode of the driving transistor, and the outputted reference voltage is applied to a source electrode of the driving transistor.

10. A display device comprising:

a display panel including a plurality of pixels configured to display an image;

a data driver configured to generate a data voltage of the image;

a gate driver configured to generate a scan signal;

a timing controller configured to receive first frame data and second frame data and output a luminance control signal based on the first frame data and the second frame data, wherein at least one of the plurality of pixel includes:

a driving element including a first electrode of the driving element that is connected to a first node to which a power supply voltage is applied, a gate electrode of the driving element that is connected to a second node to which the data voltage is applied, and a second electrode of the driving element that is connected to a third node;

a light emitting element including an anode electrode connected to the third node;

a first switch element configured to supply the data voltage to the second node responsive to the scan signal being applied to the first switch element; and a second switch element connected to the third node, the second switch element configured to apply one of a plurality of reference voltages each having a different level to the third node, wherein an output luminance of the pixel is based on a level of the outputted reference voltage to the third node, wherein a reference voltage from the plurality of reference voltages is selected to apply to the third node based on the luminance control signal and wherein the timing controller comprises:

a data sampler configured to sample the first frame data to extract sampling data from the first frame data; and a data comparator configured to compare the sampling data and the second frame data and output the luminance control signal based on a result of comparison.

11. The display device of claim 10, wherein the plurality of reference voltages include a first reference voltage having a first reference level which is a greatest level amongst the plurality of reference voltages, a second reference voltage having a second reference level that is less than the first reference level of the first reference voltage, and a third reference voltage having a third reference level that is less than the first reference level and the second reference level, wherein the first reference voltage is output responsive to the luminance control signal being at a first level, the second reference voltage is output responsive to the luminance control signal being at a second level that is greater than the first level, and the third reference voltage is output responsive to the luminance control signal being at a third level that is greater than the second level and the first level.

12. The display device of claim 10, wherein the data comparator is configured to calculate a first average image level from the second frame data, calculate a second average image level from the sampling data, and output a difference between the first average image level and the second average image level as the luminance control signal.

13. The display device of claim 10, wherein the data comparator is configured to calculate a first average current luminance from the second frame data, calculate a second average current luminance from the sampling data, and output a difference between the first average current luminance and the first average current luminance as the luminance control signal.

14. A display device comprising:

a display panel including a plurality of pixels; and a timing controller configured to simultaneously receive first frame data and second frame data, and output a luminance control signal based on a comparison of the first frame data and the second frame data that were simultaneously received, wherein an output luminance of the plurality of pixels is based on the luminance control signal, and wherein the timing controller comprises:

a data sampler configured to sample the first frame data to extract sampling data from the first frame data; and a data comparator configured to compare the sampling data and the second frame data and output the luminance control signal based on a result of comparison.

15. The display device of claim 14, further comprising:

a power supply configured to generate a plurality of reference voltages each having a different level and output a reference voltage from the plurality of reference voltages responsive to the luminance control signal, wherein the outputted reference voltage is applied to a node to which a driving and a light emitting element of at least one of the plurality of pixels is connected.

16. The display device of claim 15, wherein as a level of the luminance control signal increases one of the plurality of reference voltages having a lower level among the plurality of reference voltages is output.

17. The display device of claim 14, wherein second frame data is sampled frame data, and the data comparator is configured to compare the first frame data and the sampled second frame data by calculating a first average image level from the first frame data, calculate a second average image level from the sampled second frame data, and output a difference between the first average image level and the second average image level as the luminance control signal, or wherein the timing controller is configured to calculate a first average current luminance from the first frame data, calculate a second average current luminance from the sampled second frame data, and output a difference between the first average current luminance and the second average current luminance as the luminance control signal.

* * * * *